Figure 10:
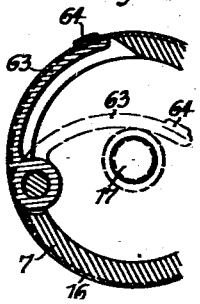

Dec. 12, 1933.  A. WINKLER ET AL  1,939,193
APPARATUS FOR WITHDRAWING SINGLE SHEETS FROM A STACK OF SHEETS
Filed Oct. 6, 1931   7 Sheets-Sheet 1
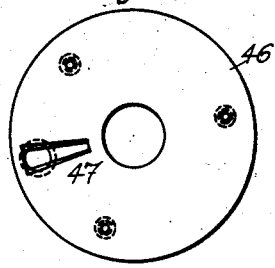
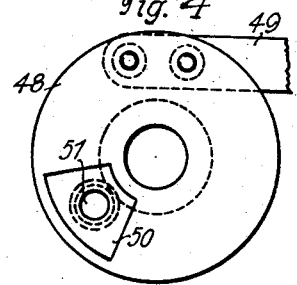
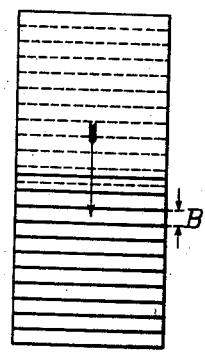
Inventors
Alfred Winkler and
Max Dünnebier.
per T. W. Wallace White
Attorney.

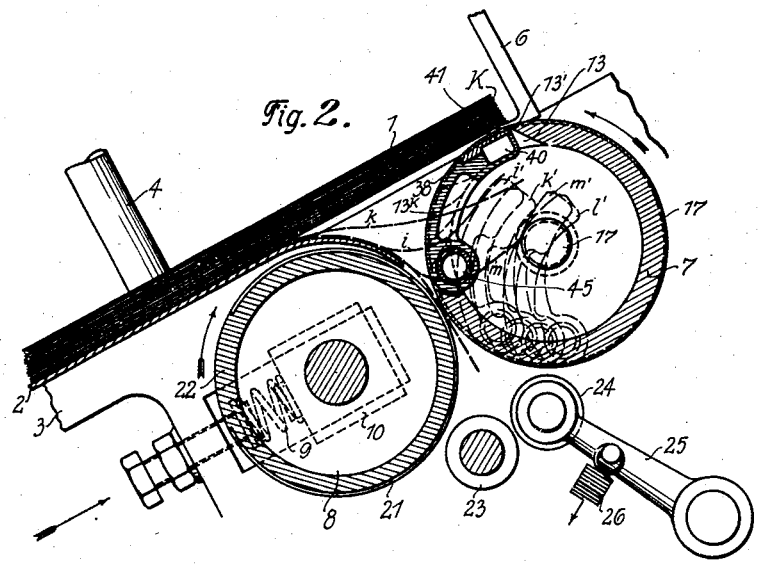
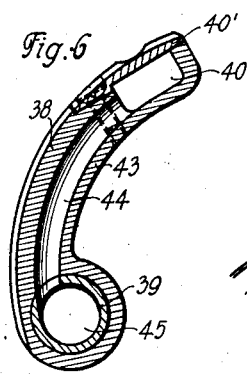
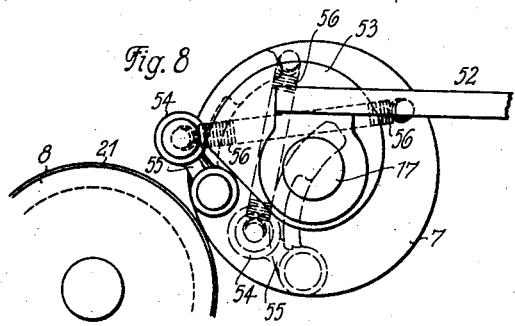
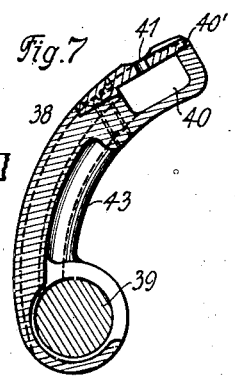
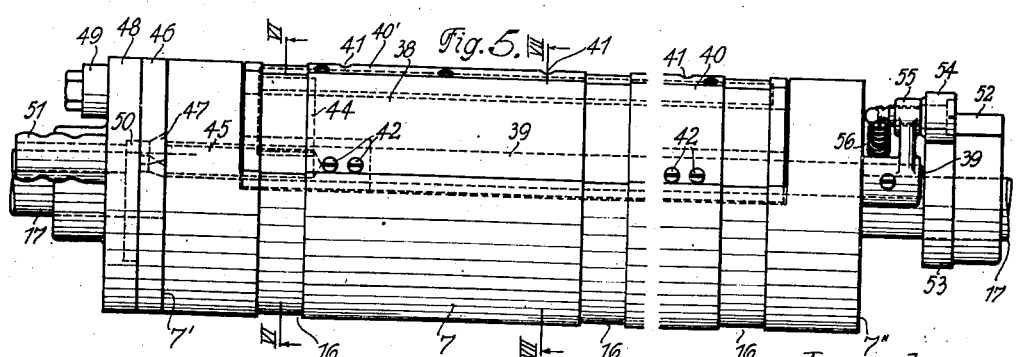

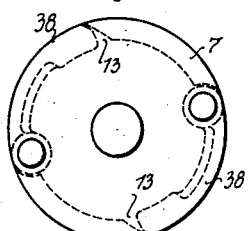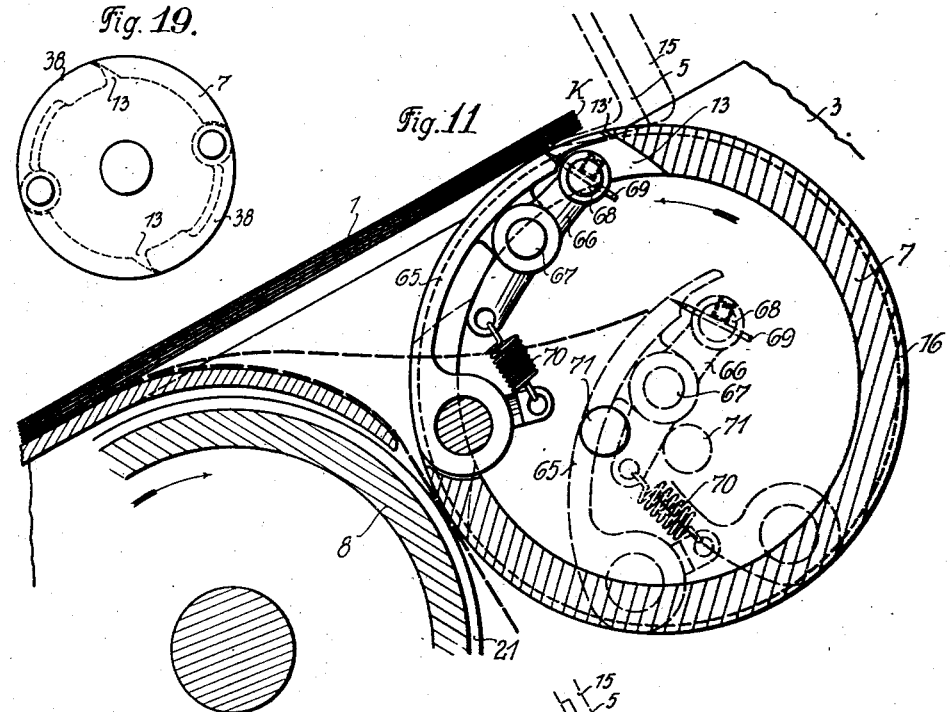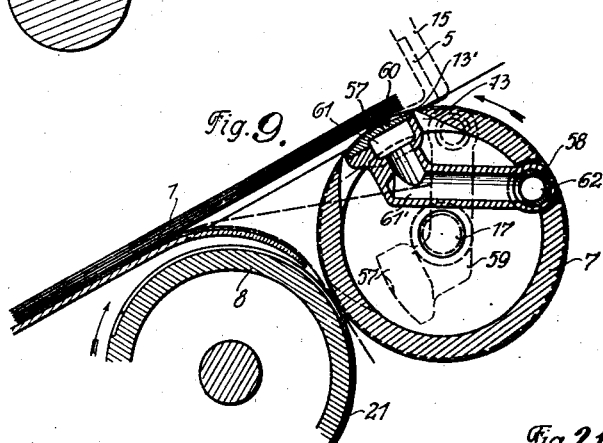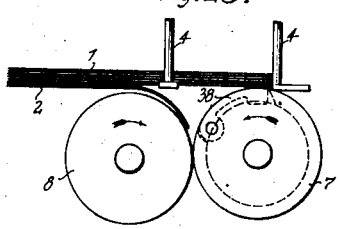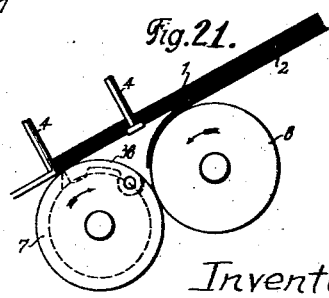

Inventors.
Alfred Winkler and
Max Dünnebier
per Wallace Waite
Attorney.

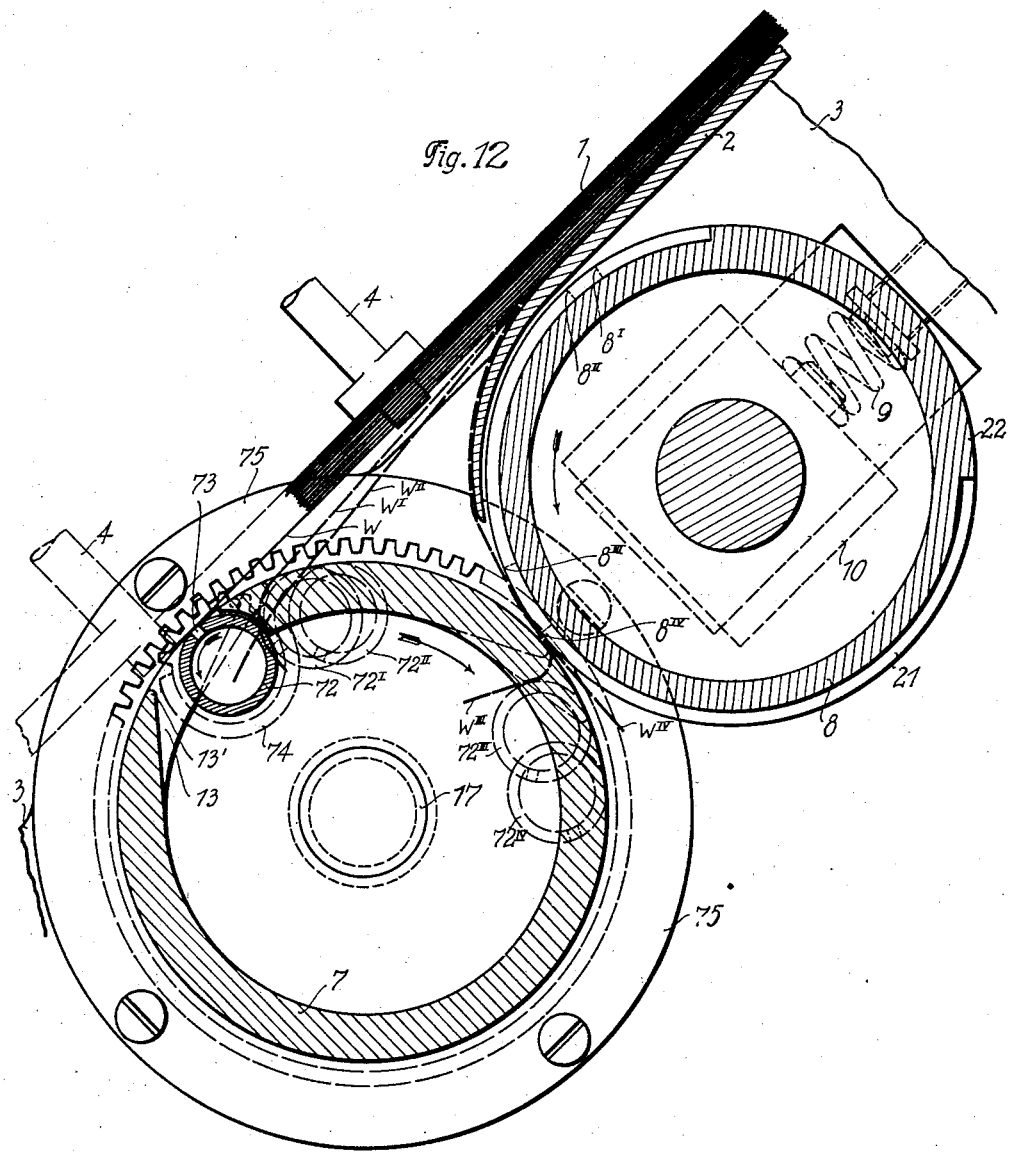

Dec. 12, 1933.  A. WINKLER ET AL  1,939,193
APPARATUS FOR WITHDRAWING SINGLE SHEETS FROM A STACK OF SHEETS
Filed Oct. 6, 1931    7 Sheets-Sheet 6
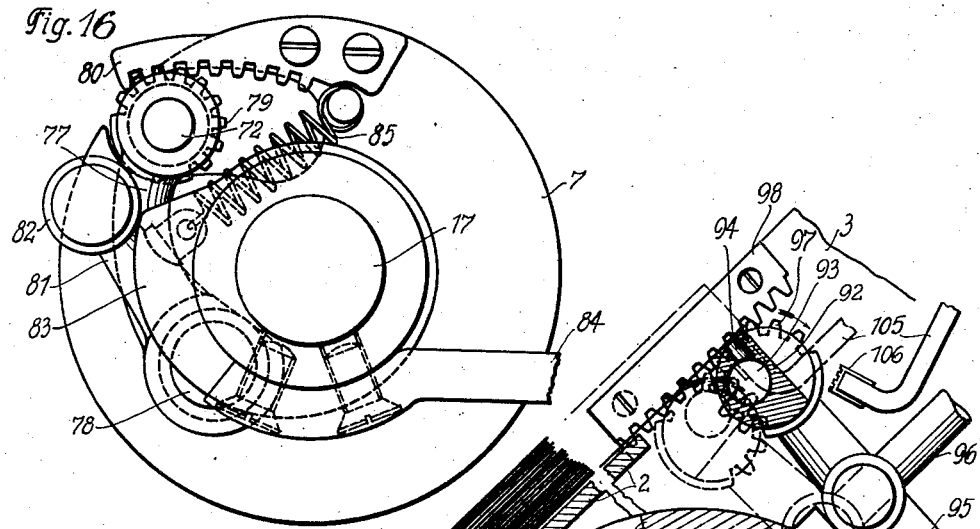
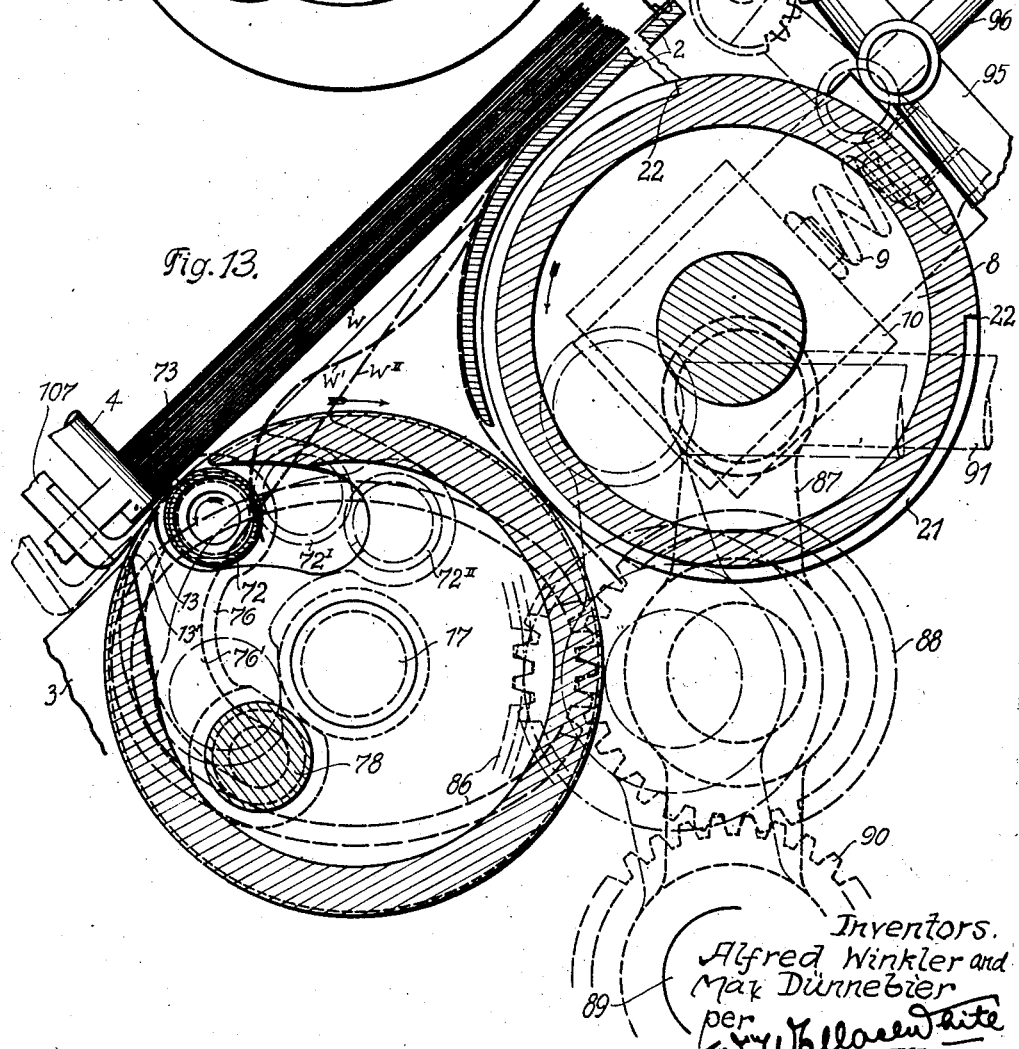
Inventors.
Alfred Winkler and
Max Dünnebier
per
W. Wallace White
Attorney.

Dec. 12, 1933.   A. WINKLER ET AL   1,939,193
APPARATUS FOR WITHDRAWING SINGLE SHEETS FROM A STACK OF SHEETS
Filed Oct. 6, 1931   7 Sheets-Sheet 7
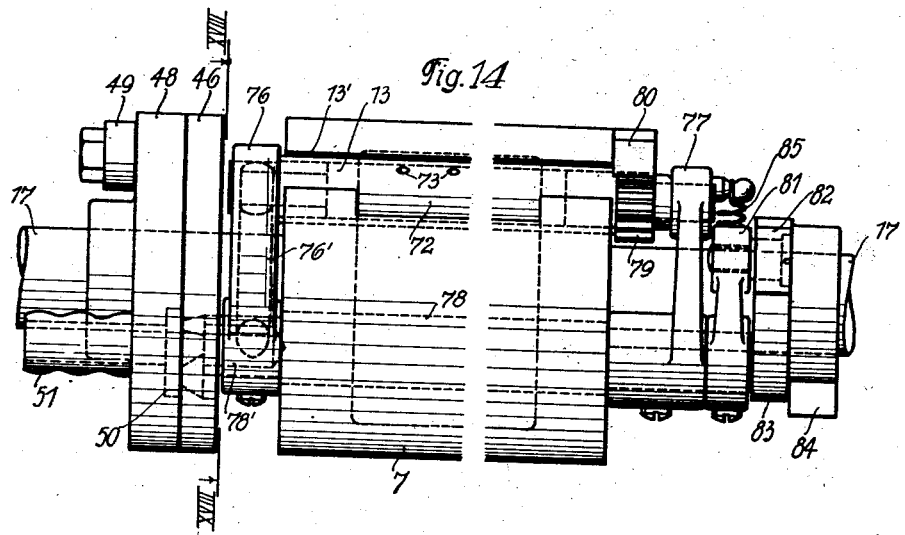
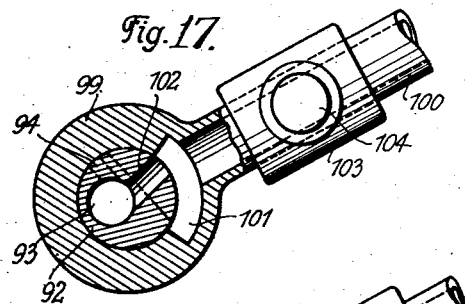
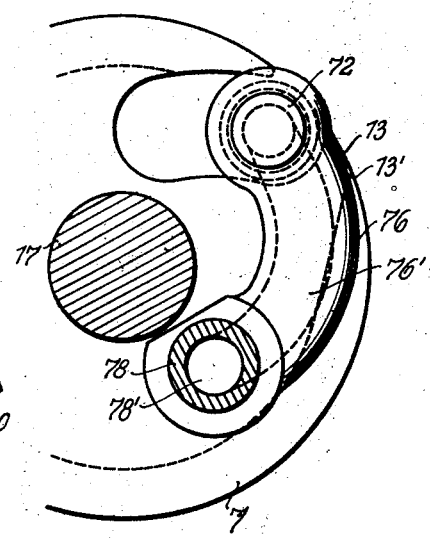
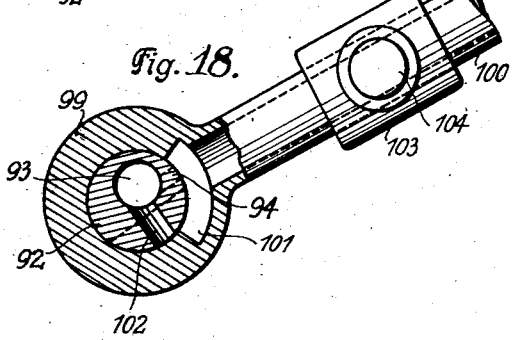
Inventors.
Alfred Winkler and
Max Dünnebier
per Wm Wallace White
Attorney.

Patented Dec. 12, 1933

1,939,193

UNITED STATES PATENT OFFICE 1,939,193

APPARATUS FOR WITHDRAWING SINGLE SHEETS FROM A STACK OF SHEETS

Alfred Winkler and Max Dünnebier, Neuwied, Germany

Application October 6, 1931, Serial No. 567,154, and in Germany April 5, 1930

33 Claims. (Cl. 271—29)

This invention relates to an apparatus for withdrawing single sheets from a stack of sheets, such as is employed in combination with printing, folding or similar machines. The invention relates more particularly to a sheet-withdrawing apparatus of the character in which two oppositely rotating rollers, without the assistance of suction devices arranged outside these rollers or other external means, themselves first separate from the stack the sheet which is to be withdrawn, that is to say they themselves initiate the withdrawal of the sheet, and then grip the sheet between them and withdraw it positively from the stack. Apparatus of this kind, which in its construction and method of operation is very simple and easy to supervise and which furthermore transfers the sheet by the shortest path into a position suitable for its conveyance to the above-mentioned machines and occupies an extremely small space, could hitherto only be used when the withdrawal of the sheet from the stack could take place with a simultaneous single folding of the sheet, because the two withdrawal rollers of the kind previously known first gripped the sheet by friction or suction and then, while displacing it relatively to the rest of the stack, they bulged it out between them, after which the bulged out portion arrived between the two rollers and was converted by them into a fold.

In accordance with the present invention, it is possible to employ apparatus for the withdrawal of sheets of the kind in question even when a sheet has to be withdrawn from the stack in an unfolded condition, that is to say in its full size.

To this end, in accordance with the invention, one of the withdrawal rollers is of hollow construction and carries on its periphery means, or a plurality of means, acting by suction, friction or in other suitable manner for gripping the sheet in the neighborhood of one of its edges and is provided also with an opening in its periphery which is arranged behind each of the said means with respect to the direction of rotation of the roller and leads into the hollow space in the roller. The method of operation of the apparatus is such that the sheet to be withdrawn is first gripped with the aid of the said means in the neighborhood of one of its edges lying transversely to the direction of withdrawal and is either bulged out or bent down from the rest of the stack. In both cases the bulged out or bent down end of the sheet is then moved positively into the said opening in the periphery of the roller so that it is received within the hollow space in the roller. It is then bent out of this again on the further rotation of the roller by the edge of the roller opening which is at the rear with respect to the direction of rotation so that it now arrives between the hollow roller and its counter-roller and is positively gripped between the two and can be withdrawn from the stack. This withdrawal from the stack can be effected either in such a manner that the sheet is at once entirely removed from the stack or in such a manner that it is withdrawn from the stack only by a predetermined amount so that the sheets are already arranged in stepped overlapping relation above and behind one another between the two withdrawal rollers.

The hollow construction of one of the withdrawal rollers in combination with the arrangement of positive withdrawal means at the periphery of the roller and an opening in the roller corresponding to each of said withdrawal means as well as the joint action of the two rollers which becomes possible owing to this construction of the roller may be considered the essential features of the present invention. The sheet gripping means which are arranged on the periphery of the hollow roller and the means which are employed for introducing the sheet into the hollow space within the roller can be of the most varied kind and their alteration in no way affects the fundamental principle of the invention. The relative sizes of the withdrawal roller and its counter roller also do not affect the fundamental principle of the invention. If the two rollers are of the same size and their speeds of revolution are the same, there is no consequently of necessity the same, there is no difficulty in gripping all the sheets between them at exactly the same place and withdrawing them by exactly the desired amount from the stack. If, on the other hand, the counter-roller for the hollow withdrawal roller has a diameter smaller than the latter, the advantage results, particularly when the withdrawal of the individual sheets takes place from the bottom of the stack, that the space between the two rollers above their line of contact, which is covered by the stack which is unsupported at this place, becomes smaller, so that there is less danger of the lower sheets of the stack sagging down into this space. Since, however, the smaller counter-roller, which coacts with the hollow withdrawal roller must have exactly the same peripheral speed as the latter and must therefore make a greater number of revolutions, special measures are necessary in this case for enabling each single sheet to be positively gripped at the same place and to be withdrawn by exactly the same amount from the stack. These measures, which likewise constitute subject matter of the invention, also enable the diameter of the hollow withdrawal roller to be of dimensions which are not subject to any upper limits provided they are within reasonable bounds having regard to the construction of the whole apparatus, and this roller can consequently have such a diameter that it can be simultaneously employed as a printing or impression cylinder. This construction of the hollow withdrawal roller as a printing cylinder is also a feature of the present invention.

Further features of the invention are a series of means which all have the common purpose of assisting the action of the two withdrawal rollers in one way or another, so that the withdrawal of a single sheet from the stack is effected with the greatest possible certainty and the carrying along with it of a second sheet, or several sheets, is avoided. These means are as follows:—

(1) Means for preventing the end of the sheet which has been released from the stack from again making contact with the stack.

(2) Means whereby the hollow withdrawal roller as well as its counter roller can be driven with variable peripheral speed, in such a manner that this peripheral speed is lowest at the moment of gripping a sheet and is highest during the withdrawal of the sheet from the stack.

(3) Means whereby the sheet to be removed from the stack is also released from the stack at its edge which is at the rear with respect to its direction of motion.

(4) Means whereby the sheet lying next to the sheet to be withdrawn is held back during the withdrawal of the latter.

(5) Means whereby the friction which occurs on withdrawing the sheet from the bottom of the stack is considerably reduced.

A number of the most advantageous forms of construction of the invention are illustrated by way of example in the accompanying drawings in which,—

Fig. 1 shows a number of work pieces arranged in stepped overlapping relation above and behind one another, Fig. 2 a vertical cross-section through one form of construction of the apparatus, Figs. 3 and 4 are views of detail parts for controlling the suction air when using withdrawal means acting by suction, Fig. 5 a view of the withdrawal roller according to the construction of Fig. 2, Figs. 6 and 7 vertical cross-sections through a part of the withdrawal roller according to the construction of Fig. 2, taken through the lines VI—VI and VII—VII respectively of Fig. 5.

Fig. 8 a side view of the form of construction according to Fig. 2.

Fig. 9 is a vertical cross-section through another form of construction of the apparatus, Fig. 10 a vertical cross-section through the withdrawal roller for still another form of construction of the apparatus, Fig. 11 a vertical cross-section through another form of construction of the apparatus, Fig. 12 a vertical cross-section through another form of construction of the apparatus, Fig. 13 a vertical cross-section through another form of construction of the apparatus, Fig. 14 a view of the hollow roller in the form of construction according to Fig. 13 viewed from the left hand side of this figure, Fig. 15 a vertical cross-section on the line XV—XV of Fig. 14, Fig. 16 is a side view of the hollow roller according to Fig. 14 seen from the right-hand side of this figure.

Figs. 17 and 18 are partial vertical longitudinal sections through the apparatus for controlling the suction air for the device for releasing the sheet from the stack at its rear edge, Fig. 19 is the diagrammatic representation of a roller with two withdrawal devices, Figs. 20 and 21 are diagrammatic representations of different arrangements of the stack in side elevation, Referring to the drawings, in all the forms of construction which are illustrated the stack of sheets 1 rests with the greater part of its surface on a fixed stack plate 2 which is secured to the sides 3 of the machine. The stack is held in its correct position by means of adjustable stops 4. The end of the stack 1 which projects beyond the stack plate 2 is supported at its upper edge K, which runs transversely to the direction in which the sheets are withdrawn, either by means of swinging supports or by means of supports 6 (Fig. 2) which are fixed in position. Below the stack 1 there are journalled in the two side walls 3 of the machine the two rollers 7 and 8, of which the roller 7 is journalled in fixed bearings and the roller 8 is yieldingly journalled in movable bearing blocks 10 which are acted upon by pressure springs 9. Both rollers rotate in the direction indicated by the arrows in opposite directions the one to the other. The actual withdrawal roller 7, which is of hollow construction, is so arranged that the line of its crest, considered relatively to the inclined stack, lies approximately in the plane of the stack plate 2, whereas the roller 8 lies below the stack plate 2 of which the end situated near the rollers is bent down in such a manner that it reaches nearly to the line of contact of the two rollers 7 and 8. Consequently the lowest sheet in the stack 1 rests on the one hand with the greater part of its surface on the stack plate 2 and as regards the remainder of its surface, disregarding the above-mentioned supports 6, on the roller 7, and the adjustment of the stack is effected with the aid of the stops 4 in such a manner that, in the arrangement of the stack which has been assumed in the Fig. 2, the upper edge K of the sheet or, in the case when for example blanks for envelopes of five-seal shape or the like are being dealt with, the upper point of the sheet projects a small distance beyond the crest of the roller considered relatively to the inclination of the stack.

In the example illustrated at Fig. 2 it is assumed that the withdrawal of each individual sheet from the stack by the rollers 7 and 8 is not to take place completely but only by a certain amount, that is to say the sheets are arranged in stepped formation above and behind one another (as shown in Fig. 1 on a smaller scale) between the rollers 7 and 8. Consequently, on the withdrawal of each fresh sheet, the sheets lying below it which has already been withdrawn and are still between the rollers 7 and 8 move together with the fresh sheet by the distance which has been selected as the length of withdrawal and corresponds to the width B of the stepping in Fig. 1, where the direction of movement of the line of sheets formed in this manner is indicated by an arrow. For effecting a partial withdrawal of this kind and the desired stepping which results therefrom the roller 8 is provided in its periphery with a recess 21 so that only the segment 22 which remains is effective for the withdrawal of the sheets. The distance of withdrawal or the width of the stepping B is consequently dependent on the length of the arc of this segment 22. By constructing the roller 8 in the known manner in two parts the length of the arc of the segment 22 can be adjusted so that the distance of withdrawal and width of stepping B can also be varied.

The row of sheets consisting of single sheets arranged in stepped formation above and behind one another arrives from the pair of rollers 7, 8 first between an intermediate roller 23 and a roller 24 co-acting therewith. Since the sheets must be conveyed by these not continuously but intermittently as by the rollers 7, 8 because some of the sheets located between them still lie below the stack, the roller 23 is positively and continuously driven by known means which are not illustrated in the drawings, whereas the roller 24 runs freely in levers 25 and is pressed against the row of sheets by a spring 26 acting on the levers 25 only with such pressure that the roller 23 slides under the row of sheets as long as these are not being conveyed forwards by the rollers 7 and 8. According to the construction of the machine to which the sheets are conducted for further treatment there may be employed either still further conveying elements which act in a manner similar to the rollers 23 and their counter rollers 24 or there may be employed directly after the rollers 23, 24 a suitably fast running pair of rollers which grip the foremost sheet of the row of sheets and withdraw it completely from the row when its rear edge, which is illustrated by dotted lines in Fig. 1, emerges from between the roller 23 and its counter roller 24.

If the sheet is to be immediately withdrawn to its full extent from the stack this can be effected up to a certain length of sheet by constructing the roller 8 not as a segmental roller but as a full roller and also by positively driving the roller 23 as well as its counter-roller 24 so fast that they completely withdraw the sheet conducted to them from the stack before the next sheet arrives between the rollers 7 and 8.

These two possibilities of a complete or only partial withdrawal of single sheets from the stack are present in all the other constructional forms of the invention which are hereinafter described.

In the form of construction according to Fig. 2 the hollow withdrawal roller 7 is provided with a flap 38 which carries a device for gripping and bulging out the lowest sheet and is revoluble about an axis 39 journalled in the roller itself in such a manner that either it forms part of the periphery of the roller and so periodically closes the roller opening 13, which is provided in accordance with the invention, or it swings back into the hollow space in the roller and thereby frees the opening in the roller. The device for gripping and bulging out the lowest sheet which is carried by the swingable flap 38 can be of various kinds. In Fig. 2 it is assumed that the flap is provided with a suction passage 40 and suction openings 41, so that, with the use of a suitable suction air controlling device, it grips the sheet to be withdrawn by suction when its suction openings 41 have arrived in the immediate proximity of the sheet. In this case, on the further rotation of the roller 7, the end of the sheet to be withdrawn is carried round with the roller, owing to the effect of the suction, and is bulged out, at the same time, however, the flap 38 is controlled in such a manner that it swings inwardly towards the interior of the roller. The end of the sheet is thus positively bent inwards into the hollow space in the roller. In this case the upper edge K of the stack rests upon stationary supports 6, and the pressure of the stack by which a small surface of the edge of the lowest sheet is pressed against the stack supports must of course be overcome.

There are illustrated in Fig. 2, in addition to the position of the flap 38 shown in full lines in which it forms a part of the periphery of the roller and closes the roller opening 13, four further positions of the flap, in dotted lines, which it takes up on the corresponding rotation of the roller 7, and these positions are denoted by $i'$, $k'$, $l'$, $m'$. The dotted position $i$ of the sheet which has been gripped by the suction openings 41 of the flap 38 and bulged out corresponds to the position $i'$ of the flap, in which it still holds the sheet; after a further short rotation of the roller 7 the suction ceases, so that the flap 38 which has now arrived in the position $k'$ releases the sheet which therefore takes up approximately the dotted position $k$. On the further rotation of the roller 7, the sheet, owing to the gripping action of the rear edge 13' of the roller opening 13 which has meanwhile arrived in the position $13^k$, slides downwards, with its free end on the outer surface of the flap, so that, when the flap 38 takes up the position $m'$, the sheet comes to lie approximately on the dotted line $m$ to be thereafter completely pushed out of the roller opening and to lie between the two rollers 7 and 8. The flap 38 now swings outward or forward again and closes the roller opening 13, before the gripping of the next sheet begins.

The flap, when provided with a withdrawal device operating by suction, is constructed as follows:—

Its shaft 39, on which it is fixed by means of screws 42, is journalled in the two faces 7' and 7'' of the roller 7 (Fig. 5). Its suction passage 40 extends over its entire length and is closed at both ends. Several suction openings 41 lead from the suction passage 40 to the outer surface of the flap. At one side, namely, the left-hand side in Fig. 5, the flap 38 is provided with a strengthening rib 43 (Figs. 6 and 7) in which there is also a suction passage 44, which effects the connection between the suction passage 40 and a bore 45 in the shaft 39, extending from the left-hand end of the axis. This ends exactly in the left-hand face of the roller 7 and any suction which occurs here at the mouth of the passage 45 is consequently transferred by the bore 45, through the suction passage 44 to the suction passage 40 and from this to the suction openings 41.

The suction passage 40, is closed by an interchangeable cover plate 40' which is provided with grooves or flutings as usual in the case of suction devices, which are suitable for the various kinds of paper and into which the suction openings open, so that the suitable cover plate 40' can be inserted for each kind of paper.

In order to control the suction air in such a manner that the suction begins and ceases at the correct moment, the following apparatus is employed in the example illustrated.

To that face of the roller 7, which is on the left-hand side in Fig. 5, there is fixed a metal plate 46, which is illustrated in Fig. 3 in a view as seen when looking from right to left in Fig. 5. This plate 46 carries a radial slit 47, which becomes narrower in the direction in which it passes through the plate and of which the width, on the side of the plate which abuts against the end surface of the roller, is such that it fully coincides with the diameter of the bore 45 in the shaft 39 of the flap. In Fig. 3, this passage and the plan of the end of the shaft are illustrated in dotted lines. The narrower dimension of the slit 47 at the other side of the plate 46 is such that its surface corresponds with the cross-section of the bore 45 in the axis. Against the outer face of the plate 46, that is, the left-hand face in Fig. 5, there is closely fitted a connecting piece 48 which is inserted loosely over the shaft 17 of the roller 7 and is held by a device 49 and is pressed against the plate 46. This connecting piece is illustrated in plan in Fig. 4 and is viewed in this figure from the same direction as the plate 46 in Fig. 3. Facing the plate 46, the connecting piece 48 has a recess 50, which is of segmental shape, and, as regards its dimensions and position measured along the radius, corresponds with the slit 47 of the plate 46. At its outer side the connecting piece 48 carries a tubular connection 51, the bore of which opens into the recess 50 and is connected to the suction pipe of a rotary air pump. The suction effect of the flap 38 therefore begins when the slit 47 in the plate 46 comes into connection with the recess 50 of the connecting piece 48 and it ends when the slit has again passed the recess, so that the duration of the suction action depends on the length of arc of the recess 50 and its beginning and ending on the adjustment of the connecting piece 48. The shape of the slit 47 of the plate 46, which is of the greatest possible width measured in the direction of the radius and is as narrow as possible in the direction of the length of the arc has the advantage that, after the slit has arrived at the recess 50 in the connecting piece 48, it comes into full connection with the aperture 50 on the smallest possible further rotation of the roller 7 so that the full suction effect begins quickly and with full force.

For controlling the flap 38 for the purpose of swinging it into the hollow space in the roller 7 and for again swinging it back out of this, there is employed a cam 53, which is also passed loosely over the shaft 17 (see the right-hand side of Fig. 5) and is held by a device 52. Engaging the cam 53 is a roller 54 on a roller lever 55 which is fixed on the shaft 39 of the flap 38 (see also Fig. 8) and is held in contact with it by means of a spring 56. In Fig. 8 the full lines show the position of the roller 54 and of the roller lever 55 when the flap 38 is swung out, i. e., when it forms a part of the periphery of the roller, and the dotted lines show the position of the said parts when the flap is swung in.

Fig. 9 shows a form of construction employing a flap 57 of which the action is fundamentally the same as in the form which has just been described. The shaft 58, on which this flap 57 is pivoted, is however displaced behind the effective part which carries the withdrawal device, with respect to the direction of rotation of the roller 7. Since the said effective part of the roller 7 which alternately swings out into the periphery of the roller and swings back again into the hollow space in the roller, is only connected at its front and rear ends, with respect to the longitudinal direction of the roller, with the shaft 58 by bearing arms 59 respectively and the distance apart of the two bearing arms is greater than the width of the largest size of blank to be operated on, the end of the sheet which is bent downwards into the hollow space in the roller, after it has been gripped by the suction openings 60 of the flap, bulged out, bent down into the hollow space in the roller and again set free, can pass unhindered between the two bearing arms 59 and can also remain between them until it again emerges from the hollow space in the roller, it need not therefore slide along the outer surface of the flap as in the construction according to Fig. 2 which may in some circumstances particularly with sensitive papers, cause harmful bending to occur. In this form of construction also, in so far as the withdrawal of the sheets is effected by suction, the one bearing arm 59 of the flap, which is illustrated in section in Fig. 9, carries a suction passage 61' which effects the connection between the bore 62 of the shaft 58 and the suction passage 61 which extends in the longitudinal direction of the flap. The control of the flap itself as well as that of the suction air is effected in the same manner as in the form of construction according to Fig. 2.

In the forms of construction which have hereinbefore been described, in which swinging flaps carrying the withdrawal device are employed, suction air is used for the withdrawal of the sheets. Other withdrawal means may however be employed without affecting the essential features of the invention in any way. For example, in Fig. 10 there is illustrated a withdrawal roller having a flap 63 which is provided with a covering 64 of rubber or other suitable material which grips the sheet by friction. With this the action is substantially the same as previously described.

Further, Fig. 11 illustrates a form of construction with a swinging flap 65, in which needles are employed for the withdrawal of and for gripping the sheet. For this purpose, there is provided on the inside of the flap a pair of double-armed levers 66, which are revolubly pivoted on a spindle 67. The arms of this pair of levers 66 which are situated at the free end of the flap are connected together, by means of a bar 68 which is fixed to them and in which the needles 69 are fixed. Tension springs 70 engage the other arms of the pair of levers 66 and thereby bring the ends carrying the needle bar 68 into contact with the inside of the flap 65. The adjustment of the needles 69 is effected in such a manner that, in the last-mentioned position of the pair of levers 66, they project some distance beyond the outer surface of the flap 65 which is provided with holes or slits for this purpose, the distance being sufficient for them to grip and bulge out the lowest sheet of the stack 1 with certainty as the flap passes. The action is then again the same as in the form of construction according to Fig. 2. For ensuring the release of the sheet from the needles without damaging it, the pair of levers 66 is controlled in such a manner that the needles 69 are retracted behind the outer surface of the flap 65 at the desired moment. For this purpose, there is employed a stop 71 provided in the hollow space in the roller against which the arms of the pair of levers 66 situated near the pivot of the flap make contact when the flap 65 swings back into the hollow space in the roller.

In all the forms of construction of the invention which have hitherto been described there is employed an inclined arrangement of the stack such that the ends of the sheet which have to be gripped and conveyed between the withdrawal rollers and their counter-rollers are located at the highest part of the stack. Instead of this, the stack may be horizontal as is diagrammatically illustrated in Fig. 20 or it may be arranged as shown in Fig. 21. In the latter case, the stack is likewise inclined but the ends of the sheets which have to be gripped and bulged out lie at its lowest point and the withdrawal roller 7 is consequently arranged in a lower position than its counter-roller 8. The method of operation of the apparatus is otherwise however the same as in the forms of construction described and the method of arranging the stack is of no importance as far as the actual essence of the invention is concerned.

An arrangement of the stack and the withdrawal rollers in the last-mentioned manner is employed in the form of construction illustrated in Fig. 12. In this case, for the withdrawal of the sheets, there is arranged inside the hollow roller 7 a suction element 72, which is revoluble about its own axis after the manner of a suction roller of small diameter, in such a way that its periphery coincides at one point with that of the hollow roller. Suction openings 73 lead to the outer surface of the suction element 72. Behind the suction element 72, with respect to the direction of rotation of the hollow roller 7 which is indicated by an arrow, there is, as in the forms of construction already described, an opening 13 in the periphery of the roller. The suction element 72 is revolubly mounted in the end walls of the hollow roller 7 and carries at one end which is closed and projects beyond the corresponding end wall of the roller 7 a small toothed wheel 74, which is in engagement with an internally toothed member 75 which is arranged on one of the side walls 3 or is otherwise fixed in position. On the rotation of the roller 7 in the direction indicated by the arrow, the suction element 72 is consequently continuously rotated in the opposite direction which is also indicated by an arrow. The method of operation of this apparatus, according to Fig. 12, is as follows:—

For controlling the suction air, there may be employed an apparatus which is substantially the same as that previously described. The one open end of the suction element 72 projects beyond the corresponding end wall of the roller 7 directly into the metal plate 46 which is tightly connected thereto and is screwed on to the end face of the roller 7 so that in this case also the suction air is intermittently connected to the interior of the suction element 72 through the agency of the metal plate 46 and the connecting piece 48. In the position of the roller 7 and the suction element 72 which has been assumed in Fig. 12 the suction begins. The lowest sheet W of the stack is therefore gripped by the suction openings 73 of the suction element 72 in close proximity of its foremost edge and, on the rotation of the roller 7, in consequence of the simultaneous rotation of the suction element which takes place in the opposite direction, is wrapped round a part of the outer surface of the latter, so that when the suction element 72 arrives at the position $72^I$ indicated by dotted lines it takes up the dotted position indicated by $W^I$. If the suction air is cut off at this moment, the position of the work piece when the suction element is in the position indicated by $72^{II}$ is approximately that indicated by $W^{II}$, and it will be seen that in this position the front end of the workpiece is introduced through the opening 13 in the roller, which is left beside the suction element, to a sufficient depth into the interior of the roller to be gripped with certainty by the longitudinal edge 13' of the roller opening which follows the suction element on the rotation of the roller and to be brought, on the further rotation of the roller 7, approximately into the position illustrated in dotted lines and indicated by $W^{III}$ in which the suction element takes up the position $72^{III}$. Meanwhile the leading edge (in direction of rotation of the roller) of the segment of the roller 8 has arrived in the position $8^{III}$, the sheet therefore is not yet gripped between the roller 7 and the segment 22 of the roller 8, but it can again move freely out of the roller opening 13 before the suction element 72 arrives in the position $72^{IV}$, when the sheet finally takes up the position $W^{IV}$. The edge of the segment roller 8 has now arrived in the position $8^{IV}$ and the sheet is positively gripped between the periphery of the roller 7 and that of the segment 22 of the roller 8 and withdrawn from below the stack by an amount which corresponds to the length of the arc of the segment 22. After the withdrawal of the sheet by this amount is completed, it is again released by the segment 22 of the roller 8 and the apparatus can in this case also either be so designed that fast running conveyer rollers which are not illustrated in the drawings take over the sheet and withdraw it completely from under the stack, or it may be so designed that the sheets are already arranged in stepped overlapping relation above and behind one another between the roller 7 and the segmental roller 8, the width of the stepping corresponding to the length of the arc of the segment 22 of the roller 8. In this case, the complete withdrawal of the individual sheets, each of which can now be gripped separately without difficulty, can be effected at any other desired place in the machine.

The method of operation of the apparatus in the form of construction according to Fig. 13 is substantially the same as that of the apparatus according to Fig. 12. The suction element 72 in this case however is journalled revolubly in a pair of levers 76, 77, which can swing about a shaft 78 which passes through the two end faces of the hollow roller 7. Since the two levers 76 and 77 are mounted outside the roller 7, the suction element 72 also projects beyond the two end faces of the roller 7 and these faces are each provided with an arcuate opening to allow the passage and the swinging movement of the suction element. Outside the roller 7 there is fixed to the suction element 72 a small toothed wheel 79 (right-hand side of Fig. 14) which engages a toothed segment 80, which is provided with internal teeth and is screwed on the face of the roller 7, so that on swinging the pair of levers 76, 77 towards the interior of the roller, the suction element 72 makes a partial rotation, which, as indicated by the arrow, (Fig. 13) is in the opposite direction to the direction of rotation of the roller 7. For swinging the pair of levers 76 and 77 there is employed a roller lever 81, (see also Fig. 16) which is fixed on the shaft 78 and of which the roller 82 runs on a cam 83 which is passed loosely over the shaft 17 of the roller 7 and is held in position by means of an adjustable fixing device 84, (Fig. 14). A tension spring 85, which acts on the roller lever 81, holds the roller 82 continuously in contact with the cam 83. The latter is so formed that, when the roller 82 runs on the highest point of the curve, the levers 76, 77 take up such a position that a line on the circumference of the suction element 72 mounted in them lies exactly in the periphery of the roller 7 or slightly higher than this, while, when the roller 82 makes contact with the lowest part of the curve, the levers 76, 77 are swung inwards as desired so that the suction element is moved into the interior of the roller 7.

When, on the rotation of the roller 7 in the direction indicated by the arrow, the roller 82 of the roller lever 81 is situated at the highest point of the cam 83, the suction element 72 takes up the position illustrated in full lines in Fig. 13 and its suction openings 73 lie in the line of contact between it and the lowest sheet of the stack. At this moment in this case also the suction air is admitted by a controlling device of the kind hereinbefore described, so that the lowest sheet of the stack is gripped by the suction element. On the further rotation of the roller 7, the pair of levers 76, 77 together with the suction element 72, which are controlled by the cam 83 in the manner described, then move towards the interior of the roller 7. At the same time, the suction element 72, owing to the toothed wheel 79, which is fixed thereto, rolling on the toothed segment 80, is partially rotated in the direction of the arrow and in a direction opposite to the direction of rotation of the roller 7, so that the sheet which is gripped by it is first bent downwards close to its front edge and is thereby placed in contact with a part of the outer surface of the suction element, that is to say it is partially wrapped round it. Therefore, when the suction element 72 has arrived in the middle position of its complete movement to the interior of the roller corresponding to the position $72^I$ (Fig. 13), the sheet takes up approximately the position $W^I$ indicated by a dotted line. On the further rotation of the roller 7 out of this position which then follows, the suction air is cut off at a pre-determined place, according to the adjustment of the air-controlling device, and the suction element 72 again releases the sheet, so that even if, in the position of the levers 76, 77 in which they are swung inwards to the furthest extent, which corresponds to the position $72^{II}$ of the suction element, the sheet does not take up exactly the position indicated by $W^{II}$ but springs back slightly instead, it can nevertheless be gripped with certainty by the edge 13' of the roller opening 13, which is to the rear with respect to the direction of rotation of the roller 7, and can be completely bent down into the interior of the roller, from which it is then bent out again and conducted between the periphery of the roller 7 and of the segment 22 of the counter roller 8, so that it is withdrawn from under the stack by both rollers together by an amount corresponding to the dimensions of the arc of the segment 22. The further complete withdrawal of the sheet can be effected in this case also by one of the methods which have previously been described.

It will be clear that the rotation of the suction element 72, in the last two forms of construction which have been described, at first effects only the bending down of a small surface of the sheet to be withdrawn in the neighbourhood of its front edge so that no adherence of the following sheet can occur to such an extent as would cause this to be completely bent down with the previous sheet, since if a second sheet starts to be bent down with the previous sheet it springs back sufficiently even if it be very thin, to separate itself again automatically. Further, after the separation of the lowest sheet at its front edge has been initiated in this manner an adhesion of the next sheet over the remaining part of its surface is little to be feared the more so because it is possible, on the further rotation of the roller 7, to cause the sheet being withdrawn, to be bulged out to a greater or less extent, according to the speed of rotation of the suction element 72, as is shown for example by the position $W^I$ of the sheet in Fig. 13. In most cases however such a bulging out of the sheet is dispensed with and the suction element 72 can be given such a speed of rotation, that the free lying part of the sheet remains stretched out approximately straight during the entire separating process, as is assumed in Fig. 12.

For the supply of the suction air in the apparatus according to Fig. 13, the lever 76 of the pair of levers 76, 77 carrying the suction element 72, which is on the left-hand side in Fig. 14, has a suction passage 76' which opens on the one hand into the interior of the suction element 72 and on the other hand into a bore 78' which extends from the left face of the shaft 78 carrying the levers 76, 77. The left-hand end (Fig. 14) of the shaft 78 engages in this case also in the right-hand face of the metal plate 46 which is in this case fixed on the shaft 17 of the roller 7, and the passage 78' is continued during the suction process by way of the plate 46, the connecting piece 48 and the suction piping leading to the air pump, which is connected thereto.

A too great peripheral speed of the roller 7 is not suitable if the individual sheets are to be gripped with certainty at exactly the right place, because then the suction openings 73 of the suction element 72, or the other means employed for gripping the sheet, pass by it too rapidly. For this reason, according to a further feature of the invention, the roller 7 is driven in such a manner that its peripheral speed varies during each revolution in such a manner that it is lowest at the moment of gripping the sheet, and highest during the withdrawal process. The means for obtaining this result may be of various kinds. In the drawings (Fig. 13) it is assumed that an elliptic toothed-wheel 86 of a kind known per se, which is fixed to the shaft 17 of the roller 7, is employed for this purpose. This is driven from an ordinary toothed wheel 88, which is journalled on a swinging lever 87 and is driven from a further toothed wheel 90, mounted on the pivot 89 of the lever 87. The toothed wheel 90 meshes with a toothed wheel, which is not illustrated in the drawings and which is driven at suitable speed from any desired part of the machine. With the upper end of the lever 87 there engages a rod 91, which is moved by means of a cam, which is not illustrated, or by means of other suitable device, in conformity with the elliptic shape of the toothed wheel 86 in such a manner that the latter is always proper mesh with the toothed wheel 88, so that the uniform speed of the toothed wheels 88, 90 and their driving wheel which is not illustrated produce a non-uniform peripheral speed of the roller 7 as desired.

An elliptic toothed wheel of this kind is particularly advantageous for driving the roller 7 when instead of one suction element 72, as has been assumed in the drawings, there are provided two suction elements arranged in diametrically opposite positions on the roller 7. In this connection it must be mentioned that in general the number of the withdrawal devices arranged on the roller 7 may be as desired as long as this is within the bounds of possibility; in such cases the action remains substantially the same as previously described. In Fig. 19, for example there is diagrammatically illustrated a withdrawal roller which is provided with two withdrawal devices of the construction according to Fig. 2. The arrangement on the roller 7 of several withdrawal devices which come into action one after another has the advantage that, with the same output, the speed of revolution of the roller can be reduced to a speed which is more favourable for securely gripping the sheet as compared with the speed when there is only one withdrawal device.

In order to increase the certainty of the separation of a single sheet from the stack, according to a further feature of the invention, the sheet to be withdrawn is also bent down from the stack in the neighbourhood of the edge which is at the rear, with respect to the direction of movement on withdrawal, by a separate device before the withdrawal begins. In the constructional example illustrated (Fig. 13) it is assumed, that suction air is employed also for this purpose and the method of operation of the device employed is similar to that of the suction element 72. A roller 92, which, for reasons hereinafter referred to, has a cross-sectional shape over a part of its length of a section or segment of a circle, is provided with a suction passage 93 which extends in the longitudinal direction of the roller and from which several suction openings 94 lead to the cylindrical part of the surface of the roller. It is journalled in a pair of levers 95 which swing in common about a shaft which is not illustrated in the drawings. With this pair of levers 95 there engages a rod 96, which is moved by cam or other suitable means not illustrated in the drawings, in such a manner that at each withdrawal of a sheet there is imparted to the pair of levers 95 a swinging movement from the position illustrated in the full lines to the position illustrated in dotted lines and back again at a predetermined speed. On the suction roller 92 there is mounted a small toothed wheel 97 which is in engagement with a toothed rack 98. Consequently at each movement of the pair of levers 95 the suction roller 92 makes an alternate right-handed and left-handed partial rotation. In the position of the lever 95 and the suction roller 92 illustrated in full lines, the suction openings 94 of the roller 92 are nearest to the lowest sheet of the stack and close to its rear edge. At this moment, owing to the action of a suitable air controlling device such as is hereinafter explained with the aid of a constructional example, the suction begins and the pair of levers 95 simultaneously begin to move over into the position illustrated in dotted lines, so that the lowest sheet of the stack due to the rotation of the suction roller 92 begins to be wrapped round it. When the pair of levers 95 together with the suction roller 92 has arrived in the position illustrated in dotted lines the suction ceases, so that the sheet is again released by the suction roller 92. The withdrawal of the sheet from the stack by the action of the rollers 7 and 8 now begins, so that the work of the suction roller 92 takes place at about the same time as the front end of the sheet is also being separated from the stack. The separation of the rear end of the sheet, by the apparatus which has just been described, not only assists its separation from the stack, but it is also of particular importance when the stack consists of layers of paper, which have all been cut out or stamped out together which is almost always the case, and when the rear edge of the stack is an edge which has been cut or stamped, because these edges of the sheet, as is well known, adhere together most strongly, and this may promote the undesired simultaneous withdrawal of two or more sheets.

For controlling the suction air for actuating the suction roller 92 acting on the rear edges of the sheets any suitable device may be employed. An example of such a controlling device for the suction air is illustrated in Figs. 17 and 18. There is fitted over the suction roller 92 a connecting piece 99 which carries a pipe 100 for connection to the suction pipe of an air pump. The bore of the pipe 100 leads into a segmental recess 101, which is provided in the interior of the connecting piece. From the suction passage 93 of the suction roller 92 a longitudinal slit 102 leads to the outer surface of the roller and the adjustment is effected in such a manner that during a predetermined partial rotation of the roller 92 its slit 102 opens into the recess 101 of the connecting piece 99, so that the connection for the passage of the suction air from the suction pipe to the suction opening 94 of the roller 92 is made. Fig. 17 shows that position of the roller 92 in the interior of the connecting piece 99 which corresponds to the position of the roller which is illustrated in full lines in Fig. 13 in which the suction commences, whereas Fig. 18 shows the position which the roller takes up, when it is in the position illustrated in dotted lines in Fig. 13 and the connection between the slit 102 and the recess 101 is disconnected, that is to say the suction air is cut off. In order to enable the suction roller 92 to make the backward and forward movement the connecting pipe 100 is movably arranged in a cross piece 103 which is itself revoluble about a pivot 104.

Instead of the devices above described other suitable controlling devices for the suction air for both the suction element 72 and also for the suction roller 92 can be employed, and the kind of device employed is of no importance so far as the actual invention is concerned. As regards the device which has last been described its importance lies only in the feature that the sheet to be withdrawn is released from the stack also at its rear edge.

In combination with the suction roller 92 acting at the rear edge of the sheet there is further arranged, in accordance with the invention, a swinging stack support 105, (Fig. 13) which, after the separation from the stack at the rear edge of the sheet has been effected, enters under the remainder of the stack and supports it over its entire width or at separate places as long as the actual withdrawal of the lowest sheet is proceeding. This stack support is covered with a strongly adherent medium, for example with a coating 106 of roughened rubber, whereby increased friction between the support 105 and the stack is produced. This precaution also makes the simultaneous withdrawal of a second sheet or several sheets difficult. The swinging movement of the stack support 106 may be seen from its positions which are illustrated in full lines and in dotted lines in Fig. 13. In order that the stack support 105 may begin to swing into the dotted line position under the stack immediately after the commencement of the forward movement of the roller 92, the cross-section of the roller over a part of its length is of the above-mentioned shape, namely that of a section or segment of a circle. At this place, the stack support 105 has room so that it can begin to swing, in under the stack immediately after the roller 92 has commenced its movement into the position illustrated in dotted lines. The means for effecting the swinging movement of the stack support 105 are not illustrated in the drawings, since they can be of any desired kind which are usually employed for such a purpose.

In the forms of construction also according to Figs. 12 and 13 the swinging or fixed stack supports 107 (Fig. 13) can be employed at the front edge of the sheet to be removed.

Further, it must be emphasized also that, in these two last described forms of construction according to Figs. 12 and 13, other means for gripping the sheet can be employed instead of suction air and these may be arranged both at the front edge as well as at the rear edge of the sheet. This also is of no consequence as far as the actual invention is concerned. Further, these two forms of construction can also be combined in such a manner that the suction element 72 is given both a continuous rotation about its own axis and a simultaneous movement, which may be only a slight one, towards the interior of the roller. For this purpose, for example, the suction element 72 can also be journalled in a pair of levers and the internally toothed member 75 (Fig. 12) can be arranged eccentrically to the roller 7 so that the suction element, which continuously rotates about its own axis is moved towards the interior of the roller either directly by means of the eccentrically arranged internal teeth, the lever bearing being provided with suitable springs, or by means of a separate controlling device for the lever bearing similarly to that shown in Fig. 16.

In all forms of construction of the invention which have been illustrated and described it is assumed that the individual sheets are to be withdrawn from the bottom of the stack. It is clear however without further explanation that, with a suitable arrangement, all the separate elements of the invention, with the exception of the application of compressed air below the stack, can also be employed for withdrawing single sheets from the top of a stack and the use of the invention for this purpose is also included within the invention.

Although the drawings and the above description disclose the best modes in which we have contemplated embodying our invention, we desire to be in no way limited to the constructional details of such disclosure, for in the practical application of our invention, many changes in form and construction may be made, as circumstances require or experience suggests, without departing from the spirit of the invention within the scope of the appended claims.

What we claim is:

1. Apparatus for the withdrawal of sheets from a stack, comprising a roller, at least one sheet gripping device journalled in said roller, at least one recess in the roller to temporarily receive the sheets gripped by said device, and means to grip the sheet after delivery thereof from said recess.

2. Apparatus for the withdrawal of sheets from a stack, comprising a roller, a device on the periphery of the roller for gripping and bulging each sheet to be withdrawn, bearing means for movably supporting the said device on the roller, an opening in the roller adjacent to said gripping device, means for operating the roller and said gripping device to insert the edge of a sheet into and deliver same from said opening, and means to grip the sheet after delivery from said opening.

3. Apparatus for the withdrawal of sheets from a stack, comprising a roller, at least one sheet gripping device journalled in said roller, at least one recess in the roller to temporarily receive the sheets gripped by said device, and a second roller engaging the first roller to grip the sheet after delivery thereof from said recess.

4. Apparatus for the withdrawal of sheets from a stack, comprising a roller, a device on the periphery of the roller for gripping and bulging each sheet to be withdrawn, bearing means for movably supporting the said device on the roller, an opening in the roller adjacent to said gripping device, means for operating the roller and said gripping device to insert the edge of the sheet into and to deliver same from said opening, and a counter-roller cooperating with the first roller to grip and convey the sheet after delivery of its edge from said opening.

5. Apparatus for the withdrawal of sheets from a stack, comprising a roller, an opening in the roller, means journalled in the roller adjacent to the leading edge of said opening for gripping the sheet and bending same into said opening, and a counter-roller for engaging the sheet after delivery from said opening.

6. Apparatus for the withdrawal of sheets from a stack, comprising a hollow roller, at least one sheet gripping device on the periphery of said roller, a recess in the roller to temporarily receive the part of the sheet while gripped by each of said devices, and a second roller cooperating with the first roller to grip the sheet after the delivery thereof from said recess.

7. Apparatus for the withdrawal of sheets from a stack, comprising a hollow roller, a gripping device on the periphery of the roller for gripping and bulging each sheet to be withdrawn, an opening in the roller adjacent to and behind said gripping device, means for rotating the roller and imparting relative movement to the gripping device to introduce the edge of the sheet into and to discharge same from said opening, and a counter-roller cooperating with the hollow roller to withdraw the sheet from the stack after delivery from said opening.

8. Apparatus for the withdrawal of sheets from a stack, comprising a hollow roller, an opening in the roller, means adjacent to the leading edge of said opening to grip the sheet near its leading edge and to bend same positively and temporarily into said opening, and a roll cooperating with said hollow roller to grip and withdraw the sheet after delivery from said opening.

9. Apparatus for the withdrawal of sheets from a stack, comprising a hollow roller, a peripheral opening in the roller, means journalled in the roller for bending each sheet temporarily and positively into said opening, a trailing edge at said opening for engaging the sheet, and a cooperating roller coacting with said edge to grip the sheet after the delivery thereof from said opening.

10. Apparatus for the withdrawal of sheets from a stack, comprising a hollow roller, a peripheral opening in the roller, a flap journalled in the roller and accommodated in said opening, means on the flap for gripping the sheet to be withdrawn and for delivering the sheet to the interior of the roller, means for swinging said flap to control the movement of the sheet and a cooperating roll for gripping the sheet after discharge thereof from the hollow roller.

11. Apparatus for the withdrawal of sheets from a stack, comprising a hollow roller, a peripheral opening in the roller, means journalled in the roller for bulging the sheet into said opening, an axial trailing edge on said opening for engaging the sheet, and a roller coacting with said axial edge to grip the sheet and to withdraw the same from the stack.

12. Apparatus for the withdrawal of sheets from a stack, comprising a hollow roller, a peripheral opening in the roller, a relatively movable member accommodated in said opening, means on the outer part of the said member for gripping each sheet near its leading edge and for delivering the sheet positively to the interior of the roller, means for turning said member to control the movement of the sheet and a cooperating roll for gripping the leading edge of the sheet after the discharge thereof from the hollow roller.

13. Apparatus for the withdrawal of sheets from a stack, comprising a hollow roller, a relatively movable member forming a part of the periphery of said roller, means for turning the said member inwardly from and outwardly to the said periphery, means on the member for gripping the sheet to be withdrawn and a counter-roller cooperating with the hollow roller to grip the sheet and to withdraw the same from the stack.

14. Apparatus for the withdrawal of sheets from a stack, comprising a hollow roller, a movable member forming part of the periphery of said roller, means for turning said member inwardly from the periphery, means on the member for gripping the sheet to be withdrawn and means for automatically disengaging said gripping means from the sheet when the member is turned inwardly from the periphery of the roller.

15. Apparatus for the withdrawal of sheets from a stack, comprising a hollow roller, a peripheral opening in the roller, means for introducing into said opening the edge of the sheet to be withdrawn, such means comprising a rotary member, means for rotating same in a direction opposite to the direction of rotation of the hollow roller, and means on the circumference of the said rotary member for gripping the sheets being withdrawn, and means cooperating with the hollow roller to receive the sheets after delivery thereof from said opening.

16. Apparatus for the withdrawal of sheets from a stack, comprising a hollow roller, a rotary element arranged within said roller, means on said element for gripping the sheets to be withdrawn, means including an internally toothed member for rotating the said element in a direction opposite to the direction of rotation of the hollow roller, and mechanism for controlling the sheet gripping means to release the sheet in proper timed relation to the rotation of the hollow roller.

17. Apparatus for the withdrawal of sheets from a stack, comprising a roller, a pivoted flap forming a part of the periphery of said roller, cam and spring mechanism for swinging the flap inwardly from and outwardly to the said periphery, means on the external surface of the flap for gripping the sheet to be withdrawn and a counter-roller cooperating with the first roller to withdraw the sheet from the stack after the sheet is released by said gripping means.

18. Apparatus for the withdrawal of sheets from a stack, comprising a roller, a swinging flap forming part of the periphery of said roller, and mounted with an axis parallel to the axis of the roller, means for swinging said flap inwardly about its axis, means on the outer surface of the flap for gripping the sheet to be withdrawn, and means for automatically disengaging said gripping means from the sheet when the flap is swung inwardly.

19. Apparatus for the withdrawal of sheets from a stack, comprising a hollow roller, a peripheral opening in the roller, means for introducing into said opening the leading edge of the sheet to be withdrawn, such means comprising a rotary member mounted within the hollow roller and having an axis of rotation parallel to the axis of said roller, and means for rotating said member in a direction opposite to the direction of rotation of the hollow roller, and means on the rotary member for gripping the sheets being withdrawn.

20. Apparatus for the withdrawal of sheets from a stack, comprising a hollow roller, a cylindrical element arranged within said roller, means on the circumference of said element for gripping the sheets to be withdrawn, means including an internally toothed member for rotating the said element within the roller and in a direction opposite to the direction of rotation of the roller, and control mechanism to ensure release of the sheet by said gripping means in proper timed relation to the rotation of the hollow roller.

21. Apparatus for the withdrawal of sheets from a stack, comprising a roller, a peripheral opening in the roller, a rotary element mounted within the roller and adjacent to said opening, sheet gripping means on said element, means for swinging said element inwardly from and outwardly towards the periphery of the roller, and means for rotating the element in a direction opposite to the direction of rotation of the roller to introduce into said opening the leading portion of the sheet being withdrawn.

22. Apparatus for the withdrawal of sheets from a stack, comprising a roller, a peripheral opening in the roller, a rotary element adjacent said opening, cam and spring means for swinging said element inwardly from and outwardly to the periphery of the roller and means on the periphery of said element for gripping and releasing the sheet being withdrawn to introduce the sheet into and deliver the same from said peripheral opening.

23. Apparatus for the withdrawal of sheets from a stack, comprising a hollow roller, means journalled in the roller for gripping the sheets to be delivered, a counter-roller adapted to cooperate with said hollow roller, and means for driving the said rollers in opposite directions at varying peripheral speeds during each revolution so that the peripheral speed is lowest at the moment of gripping of the sheet and is highest during the withdrawal of the sheet from the stack.

24. Apparatus for the withdrawal of sheets from a stack, comprising a roller, a peripheral opening in the roller, means in said opening for gripping the sheet, a counter-roller cooperating with said hollow roller and means for rotating both rollers at varying peripheral speed so that the speed of rotation is lowest at the moment of gripping the sheet and is highest during the withdrawal of the sheet from the stack.

25. Apparatus for the withdrawal of sheets from a stack, comprising a hollow roller, a peripheral opening in the roller, to temporarily receive the sheet being withdrawn, a rotary element mounted within the roller and adjacent to said opening, sheet gripping means on said element, means for swinging said element inwardly from and outwardly towards the periphery of the roller, means for rotating the element in a direction opposite to the direction of rotation of the roller, a counter roller cooperating with the hollow roller to withdraw the sheet, and means for rotating said rollers in synchronism at varying speeds.

26. Apparatus for the withdrawal of sheets from a stack, comprising a hollow roller, a peripheral opening in the roller to temporarily receive the leading portion of the sheet being withdrawn, a rotary element adjacent said opening, cam means for swinging said element inwardly from and outwardly to the periphery of the roller, means on the periphery of said element for gripping and releasing the sheet being withdrawn, and means for rotating the roller at a speed that varies uniformly during each revolution.

27. Apparatus for the withdrawal of sheets from a stack, comprising a hollow roller, means journalled at the periphery of the roller for gripping the sheets to be delivered, a counter-roller cooperating with said hollow roller to withdraw the sheet from the stack, and means for driving the said rollers at peripheral speeds varying uniformly during each revolution of the hollow roller so that the peripheral speed is lowest at the time of manipulation of the sheet by said gripping means and is highest during the withdrawal of the sheet from the stack.

28. Apparatus for the withdrawal of sheets from a stack, comprising a roller, a peripheral opening in the roller, means journalled in said opening for gripping the sheet to introduce the leading part thereof positively and temporarily into said opening, a counter roller cooperating with said hollow roller to engage the sheet, and means for rotating both rollers at such peripheral speeds that the speed of rotation is lowest during the introduction of the sheet into said opening and is highest during the engagement of the sheet by the rollers.

29. Apparatus for withdrawing sheets from a stack, comprising a hollow roller and a cooperating roller, sheet gripping means journalled at the periphery of the hollow roller, an opening in the hollow roller to receive the sheet being withdrawn, and means for engaging the trailing edge of the sheet for facilitating withdrawal of such sheets from the other sheets in the stack.

30. Apparatus for the withdrawal of sheets from a stack, comprising a hollow roller, means journalled in the roller and located at the periphery of said roller for gripping the sheet being withdrawn, a peripheral opening in the hollow roller to receive the leading part of the sheet, a counter-roller for the withdrawal of the sheets, and means for the release of the trailing edge of the sheet comprising a rotary member, swinging means carrying said member, means for rotating said member, and means on the member for gripping the sheet.

31. Apparatus for withdrawing sheets from a stack, comprising a hollow roller and a cooperating roller of smaller diameter, sheet gripping means journalled in the hollow roller, a sheet receiving opening at the periphery of the hollow roller, and means for intermittently engaging the trailing edge of the sheets for facilitating withdrawal by said rollers of such sheets from the other sheets in the stack.

32. Apparatus for the withdrawal of sheets from a stack, comprising a hollow roller, an opening in the roller to receive the leading part of the sheet, means journalled in the roller and located at the periphery of said roller for gripping the sheet to be withdrawn, a counter-roller for the withdrawal of the sheets, and means for the release of the trailing edge of the sheet comprising a roller, swinging means carrying said roller, rack-and-pinion mechanism for rotating said roller and means on the periphery of the roller for gripping each sheet.

33. Apparatus for the withdrawal of sheets from a stack, comprising a hollow roller, a sheet gripping member mounted to rotate in said roller, a peripheral opening in the hollow roller to receive the leading part of the sheet to be withdrawn, a counter-roller cooperating with the hollow roller, a swinging stack support for the rear edge of the stack, rotary swinging means for releasing at its trailing edge the sheet being withdrawn, and means engaging the underside of the stack to produce increased friction against the remaining sheets in the stack during each withdrawal.

ALFRED WINKLER.
MAX DÜNNEBIER.